(12) United States Patent
Murata (10) Patent No.: US 7,673,731 B2
(45) Date of Patent: Mar. 9, 2010

(54) TWO-WAY CLUTCH

(75) Inventor: Taisuke Murata, Obu (JP)

(73) Assignee: Denso Corporation, Kariya (JP)

( * ) Notice: Subject to any disclaimer, the term of this patent is extended or adjusted under 35 U.S.C. 154(b) by 490 days.

(21) Appl. No.: 11/607,924

(22) Filed: Dec. 4, 2006

(65) Prior Publication Data

US 2007/0144854 A1    Jun. 28, 2007

(30) Foreign Application Priority Data

Dec. 26, 2005  (JP) .............................. 2005-372629
Jul. 6, 2006   (JP) .............................. 2006-187088

(51) Int. Cl.
*F16D 41/064*  (2006.01)
(52) U.S. Cl. ..................... 192/223.2; 192/38
(58) Field of Classification Search .................. 192/38, 192/223.2
See application file for complete search history.

(56) References Cited

U.S. PATENT DOCUMENTS

| | | | | |
|---|---|---|---|---|
| 4,261,224 A | * | 4/1981 | Sulzer | ........................... 475/2 |
| 4,434,878 A | * | 3/1984 | Okubo | ..................... 192/48.92 |
| 4,499,980 A | * | 2/1985 | Kaminski et al. | ............. 192/35 |
| 6,575,277 B1 | | 6/2003 | Torii et al. | |
| 6,789,443 B1 | | 9/2004 | Torii et al. | |

FOREIGN PATENT DOCUMENTS

JP   2001-214946   8/2001

* cited by examiner

*Primary Examiner*—Richard M. Lorence
(74) *Attorney, Agent, or Firm*—Nixon & Vanderhye PC (57) ABSTRACT

A two-way clutch has a rotational driving unit, a rotational driven unit, a roller interposed between the rotational driven unit and a collar, which is a fixed member and is not rotatable. A recess is formed in an inner peripheral surface of the collar, so that the roller is engaged with the recess. As a result, a locked condition between the rotational driven unit and the collar by means of the roller is not easily released. Therefore, the rotational driven unit is stably held at its locked position, even when a high vibration, a high load and/or a large pulsation is applied to the rotational driven unit.

7 Claims, 6 Drawing Sheets

TWO-WAY CLUTCH

CROSS REFERENCE TO RELATED APPLICATION

This application is based on Japanese Patent Application Nos. 2005-372629 filed on Dec. 26, 2005, and 2006-187088 filed on Jul. 6, 2006, the disclosures of which are incorporated herein by reference.

FIELD OF THE INVENTION

The present invention relates to a two-way clutch, which, on one hand, transmits a rotational force applied to a rotational driving unit to a rotational driven unit, and on the other hand, transmits a rotational force applied to the rotational driven unit not to the rotational driving unit but to a collar, which is a fixed member. More particularly, the present invention relates to a two-way clutch, a rotational driven unit of which is operatively connected to a switching device for a fluid passage directly or via speed reduction gear, wherein a fluid pressure pulsation is generated in the fluid passage.

BACKGROUND OF THE INVENTION

In a conventional apparatus, for example, a switching device for a swirl control valve, a switching member is provided in a fluid passage (e.g. an intake passage, an exhaust passage, and so on), in which a fluid pressure pulsation is generated, and the switching member is operated by an electric motor through a speed reduction gear.

In the above apparatus, however, an electrical power is necessary for maintaining an opening degree of the switching member, even in the case that the switching member is continuously held at its certain switching position (e.g. at a fully-opened or a fully-closed position). This is because the opening degree of the switching member is held by the electric motor, to which the electrical power is supplied.

It is, therefore, proposed in the art to stop the supply of the electrical power to the electric motor when the switching member is continuously held at its certain switching position, by using a two-way clutch, which, on one hand, transmits a rotational force applied to a rotational driving unit to a rotational driven unit, and on the other hand, transmits a rotational force applied to the rotational driven unit not to the rotational driving unit but to a collar, which is a fixed member. Such a prior art is disclosed in, for example, PCT Patent Publication No. 00/08349, PCT Patent Publication No. 00/08350, or Japanese Patent Publication No. 2001-214946.

According to PCT Patent Publication No. 00/08349, or PCT Patent Publication No. 00/08350, a collar is arranged at an outer periphery of a rotational driven unit. According to Japanese Patent Publication No. 2001-214946, a collar is arranged at an inner periphery of a rotational driven unit.

A conventional two-way clutch will be explained with reference to FIG. 6.

The conventional two-way clutch has a rotational driving unit J1 rotated by an electric motor (not shown), and a rotational driven unit J2 to be rotated when it is brought into contact with the rotational driving unit J1 in a circumferential (rotational) direction. A non-rotatable member (an annular collar) J3 is provided at an outer periphery of the rotational driving unit J1. A roller J4 is disposed in a space between the rotational driven unit J2 and the collar J4.

An outer peripheral surface of the rotational driven unit J2 is opposed to an inner peripheral surface of the collar J3, such that a distance L1 of a large space portion between the rotational driven unit J2 and the collar J3 at a middle point of the outer peripheral surface is larger than a distance L2 of a small space portion between the rotational driven unit J2 and the collar J3 at a side point of the outer peripheral surface.

An outer diameter (a dimension in a radial direction) L3 of the roller J4 is so made to be larger than the distance L2 but smaller than the distance L1.

A projection J5 is formed at a circumferential side end of the rotational driving unit J1, such that the projection J5 pushes the roller J4 toward the large space portion (L1) when the rotational driving unit J1 is brought into contact with the rotational driven unit J2.

The above two-way clutch operates as below.

(In Motor Operation)

In the case that the electric motor is rotated in its forward or reverse direction, the rotational driving unit J1 is rotated by the rotational force applied to the rotational driving unit J1, so that the projection J5 pushes the roller J4 to the large space portion L1. As a result, the rotational driving unit J1 as well as the rotational driven unit J2 is brought into a condition, in which the units J1 and J2 are freely rotatable with respect to the collar J3. Then, the rotational driving unit J1 is brought into contact with the rotational driven unit J2, so that the rotational force of the rotational driving unit J1 is transmitted to the rotational driven unit J2 and the rotational driven unit J2 is rotated together with the rotational driving unit J1.

(When Power Supply to the Motor is Cut Off)

Figure 6:
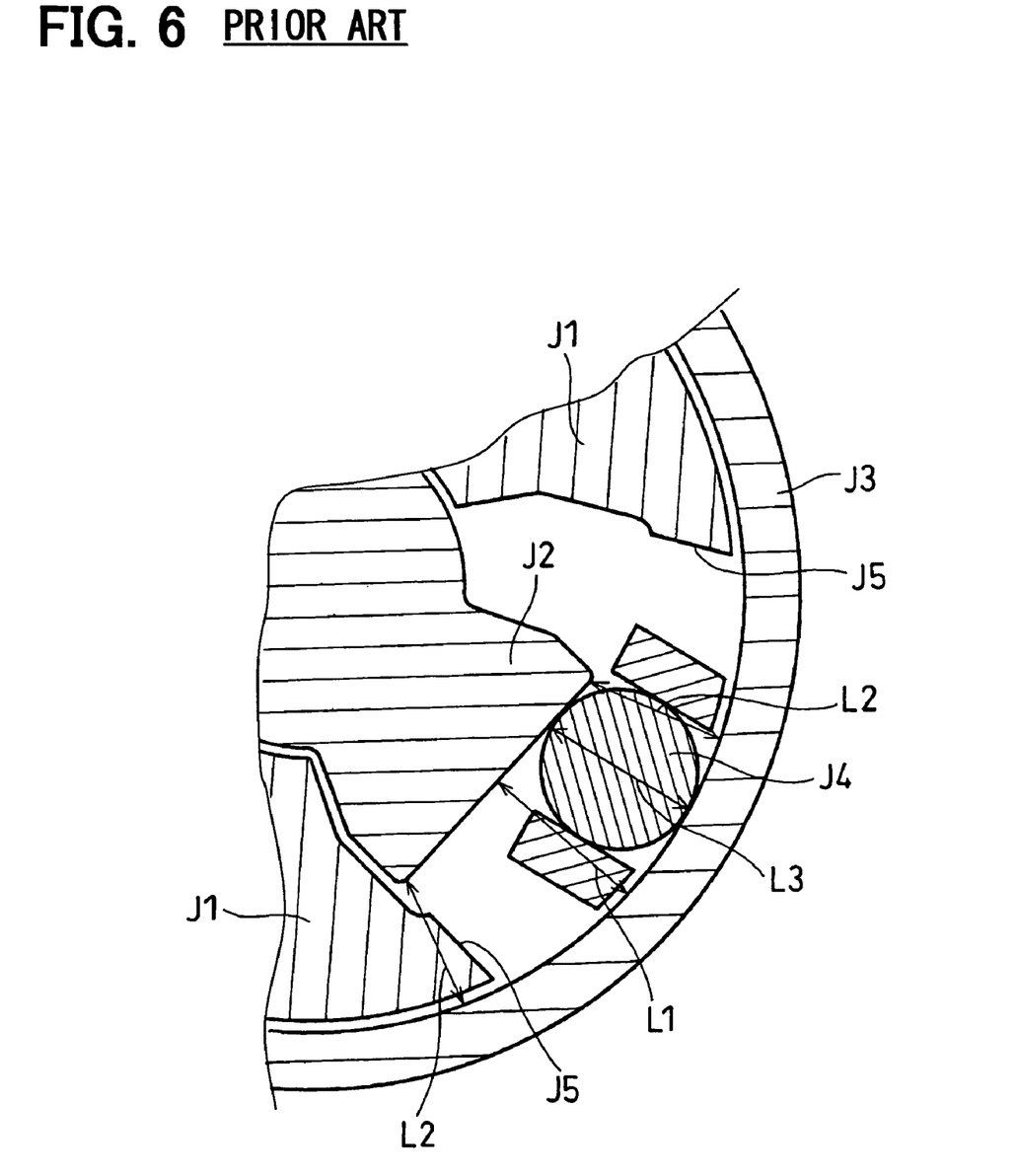
FIG. 6 is a schematic cross sectional view showing a major portion of a two-way clutch according to a prior art.

When the rotational force is applied to the rotational driven unit J2 during a condition, in which electrical power supply to the electric motor is cut off, the roller J4 is firmly held between the rotational driven unit J2 and the collar J3 as a result of even a small rotation of the rotational driven unit J2 with respect to the collar J3, so that the rotational driven unit J2 is engaged with the collar J3 by means of the roller J4, as shown in FIG. 6. Accordingly, the rotation of the rotational driven unit J2 is restricted.

The two-way clutches disclosed in the above mentioned patent publications are generally used for a vehicle power window system. If, however, the above clutch was applied to a switching device for the passage (e.g. the intake passage, the exhaust passage, or the like), in which the fluid pressure pulsation is generated, the clutch of the above kind may not sufficiently restrict the rotation of the switching device, when high vibration, high load, and/or large pulsation is applied to the switching device.

Accordingly, a performance for maintaining the switching device at its certain switching position is decreased.

In the case that the switching position is operated by a feed-back control, a number of operations for correcting the switching position will be extremely increased, and durability of a speed reduction gear, bearings, the electric motor and so on may be deteriorated.

The problem of the two-way clutch is explained as above, when it is applied to a driving mechanism of the switching device for the passage, in which the fluid pressure pulsation is generated. However, the same or similar problem may occur when the above two-way clutch is applied to any other purpose. Namely, the rotational driven unit may be moved (can not be held at a desired position) due to the high vibration, the high load, and/or the large pulsation, when the power supply to the electric motor is cut off.

SUMMARY OF THE INVENTION

The present invention is made in view of the foregoing problems, and has an object to provide a two-way clutch, according to which a rotational driven unit may not be moved even under a condition of the high vibration, the high load, and/or the large pulsation, when an operation of a driving device (an electric motor) for a rotational driving unit is stopped.

According to one of the features of the invention, a two-way clutch has a rotational driving unit to be rotated by an external driving device (e.g. an electric motor), a rotational driven unit to be brought into contact with the rotational driving unit in a circumferential direction, and to be rotated by the rotational driving unit, a non-rotatable annular collar arranged at an outer periphery of the rotational driven unit, and an interposed member interposed between the rotational driven unit and the collar.

In the above two-way clutch, a large space portion is formed in a radial direction of the rotational driven unit between an outer peripheral surface of the rotational driven unit and an inner peripheral surface of the collar. Small space portions are also formed in the radial direction of the rotational driven unit, at both circumferential sides of the large space portion, and between the outer peripheral surface of the rotational driven unit and the inner peripheral surface of the collar. A distance of the small space portions in the radial direction of the rotational driven unit is smaller than that of the large space portion. An outer length of the interposed member in the radial direction of the rotational driven unit is smaller than the distance of the large space portion but larger than the distance of the small space portion.

In addition, a projection is formed at the rotational driving unit for pushing the interposed member toward the large space portion, when the rotational driving unit is brought into contact with the rotational driven unit in the circumferential direction, and a recess is formed in the inner peripheral surface, so that the interposed member is engaged with the recess when the rotational driven unit is locked to the collar via the interposed member.

According to the above structure for the two-way clutch, a locked condition between the rotational driven unit and the collar by means of the interposed member (the roller) is not easily released. Therefore, the rotational driven unit is stably held at its locked position, even when a high vibration, a high load and/or a large pulsation is applied to the rotational driven unit.

According to another feature of the invention, a raised surface portion is formed at a circumferentially neighboring point to the recess in the inner peripheral surface of the collar, and the recess has a circumferential length such that a contacting point of the interposed member is located in the recess, wherein the interposed member is temporally separated from the inner peripheral surface of the collar and brought into contact again with the inner peripheral surface of the collar at the contacting point when the rotational driven unit is rotated at a high speed.

According to such a structure, a generation of an abnormal noise (i.e. a hitting sound) as well as deterioration of durability for the interposed member (roller) and the collar is suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1A:
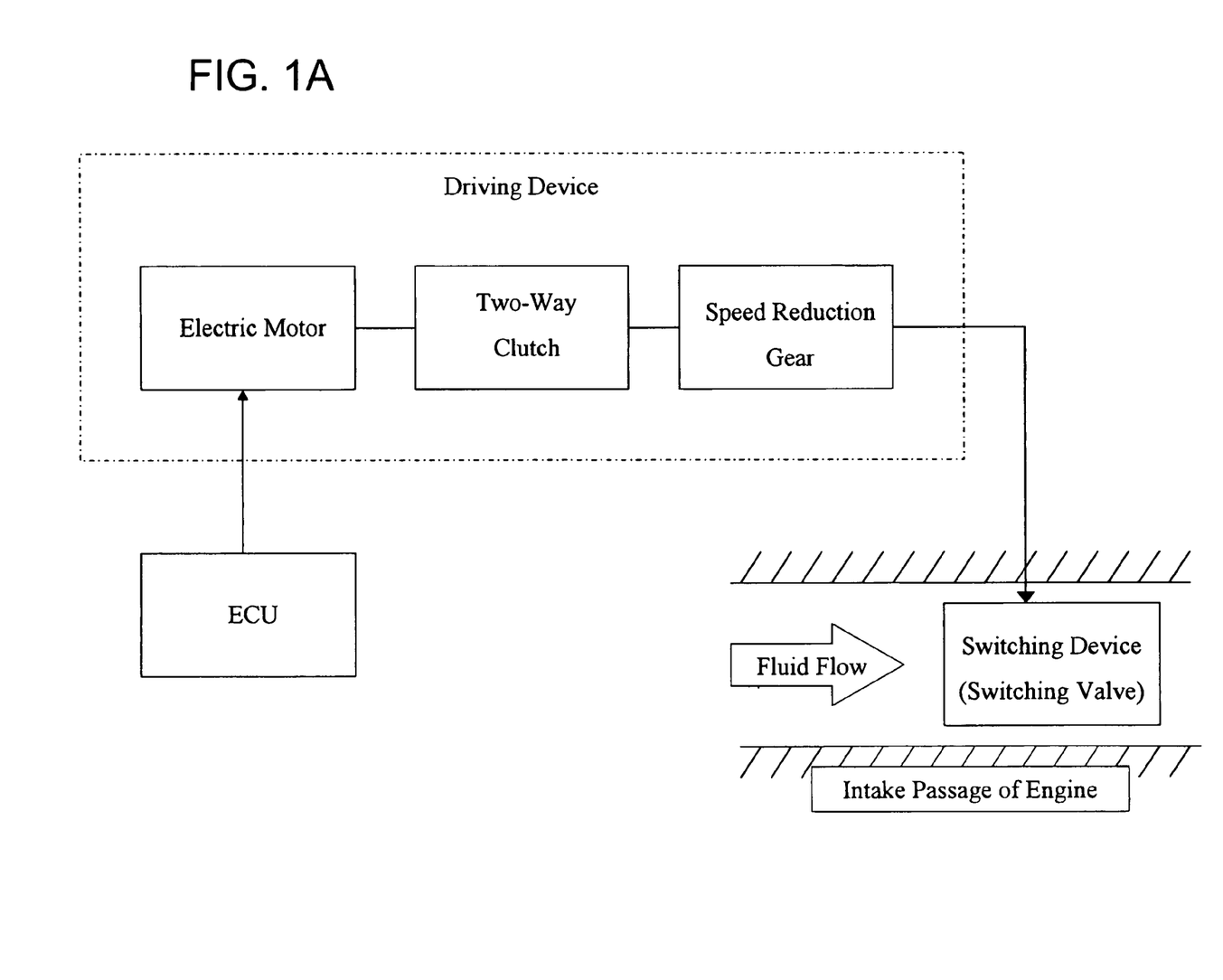
FIG. 1A is a schematic illustration of a two-way clutch applied to a driving device for a switching device mounted in a passage.
Figure 1B:
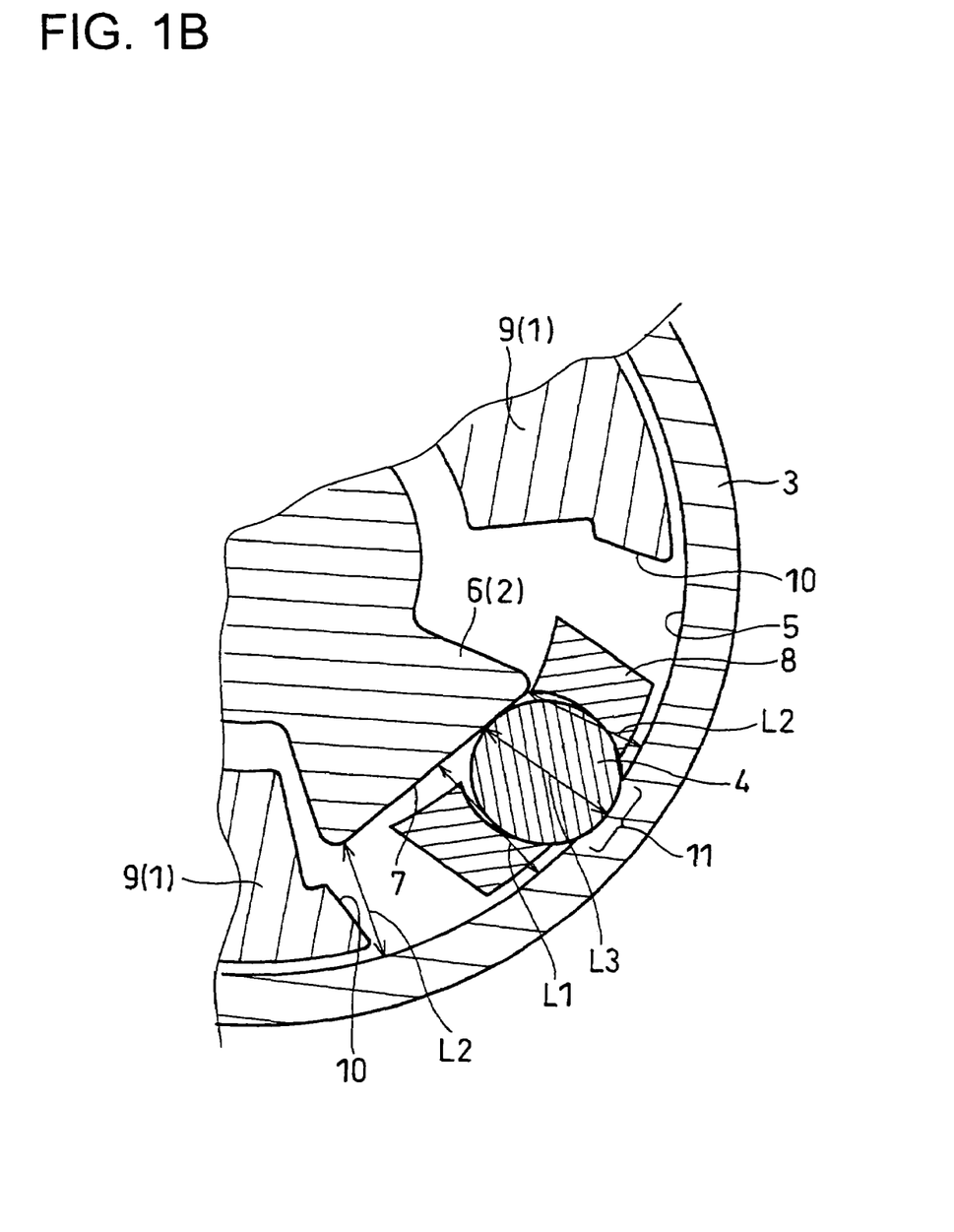
FIG. 1B is a schematic cross sectional view showing a major portion of a two-way clutch according to a first embodiment of the present invention.

A first embodiment of the present invention will be explained with reference to FIGS. 1A and 1B. A two-way clutch of the first embodiment is applied to a driving device for a switching device (a switching valve) mounted in a passage (e.g. in an intake passage or an exhaust passage of an engine), in which a fluid pressure pulsation is generated. The driving device has a driving means (e.g. an electric motor) rotated in a forward or a reversed direction when electrical power is supplied thereto, a speed reduction gear for reducing a rotational speed and transmitting the rotational force to the switching device, and a two-way clutch provided between the electric motor and the speed reduction gear. An operation of the electric motor is controlled by an electronic control unit (ECU).

The two-way clutch has a rotational driving unit 1 rotated by the electric motor, and a rotational driven unit 2 to be rotated when it is brought into contact with the rotational driving unit 1 in a circumferential (rotational) direction. A non-rotatable member (an annular collar) 3 is provided at an outer periphery of the rotational driving unit 1. A roller 4 (i.e. an interposed member) is disposed in a space of a radial direction between the rotational driven unit 2 and the collar 3. The above parts and/or elements may be made of metal or rigid resin.

The collar 3 of the embodiment is formed in a shape of an annular body, which is arranged at and covers an outer periphery of the rotational driving unit 1 and the rotational driven unit 2. An inner peripheral surface 5 of the collar 3 acts as a surface to be engaged with the roller 4. A shaft center of the inner peripheral surface 5 of the collar 3 coincides with a rotational center of the rotational driving unit 1 and the rotational driven unit 2. The collar 3 is formed integrally with a housing of the driving device, or fixed to the housing, so that the collar 3 may not be rotated.

The rotational driven unit 2 is connected to an input shaft for the speed reduction gear (an output shaft when viewed from the two-way clutch), and has one or multiple fan-shaped portion(s) 6 extending in a radially outward direction from the rotational center. A flat surface portion 7 is formed at an outer peripheral surface of the fan-shaped portion 6, wherein the flat surface portion 7 is formed as to be parallel to a tangential line of the inner peripheral surface 5 of the collar 3.

Accordingly, a large space portion L1 and small space portions L2 are formed between the flat surface portion 7 of the fan-shaped portion 6 and the inner peripheral surface 5 of the collar 3, wherein a distance (L2) in the radial direction of the small space portion L2 is smaller than that of the large space portion L1. The small space portions L2 are formed at both sides of the large space portion L1 in a circumferential direction.

The roller 4 is formed in a cylinder solid, which is interposed in the radial direction between the flat surface portion 7 of the fan-shaped portion 6 and the inner peripheral surface 5 of the collar 3. A holder member 8 is arranged in a space between the fan-shaped portion 6 and the collar 3, so that both sides of the roller 4 are rotatably supported by the holder member 8 in the circumferential direction, wherein the holder member 8 is rotatably supported with respect to the rotational center of the rotational driving unit 1 and the rotational driven unit 2.

An outer diameter (a dimension in a radial direction) L3 of the roller 4 is so made to be larger than the distance L2 but smaller than the distance L1. As a result of the dimensional relation (L1>L3>L2), the roller 4 is always held in the radial space defined by the fan-shaped portion 6 and the collar 3.

The rotational driven unit 2 is allowed to be rotated relative to the collar 3, when the roller 4 is positioned at such a portion, a radial distance of which between the flat surface portion 7 and the inner peripheral surface 5 is larger than the diameter L3 of the roller 4. The roller 4 is tightly held by and between the flat surface portion 7 and the inner peripheral surface 5, when the roller 4 is positioned at such a portion, a radial distance of which between the flat surface portion 7 and the inner peripheral surface 5 becomes equal to (or slightly smaller than) the diameter L3 of the roller 4. Namely, the rotational driven unit 2 is brought into a tight engagement (i.e. a locked condition) with the collar 3 by means of the roller 4. The rotation of the rotational driven unit 2 is, therefore, restricted by the collar 3.

The rotational driving unit 1 is connected to an output shaft of the electric motor (an input shaft when viewed from the two-way clutch), and has one or multiple fan-shaped portion(s) 9 arranged in the circumferential direction between the fan-shaped portions 6 of the rotational driven unit 2. The fan-shaped portion 9 is brought into contact with the fan-shaped portion 6, when the rotational driving unit 1 is rotated by the electric motor, so that the rotational force of the rotational driving unit 1 is transmitted to the rotational driven unit 2.

Projections 10 are formed at both circumferential side ends of the fan-shaped portion 9, such that each of the projections 10 projects in the circumferential (rotational) direction. The projection 10 pushes the roller 4 toward the large space portion L1 when the fan-shaped portion 9 is brought into contact with the fan-shaped portion 6, so that the roller 4 is moved to such a position, a radial distance of which between the flat surface portion 7 and the inner peripheral surface 5 is larger than the diameter L3 of the roller 4.

More exactly, as the both circumferential sides of the roller 4 are supported by the holder member 8, as explained above, the projection 10 pushes the holder member 8 in the circumferential direction. As a result, the roller 4 is moved to the large space portion L1, at which the roller 4 is allowed to rotate in the space between the fan-shaped portion 6 and the collar 3.

A basic operation of the above two-way clutch will be explained.

(An Operation of Power Supply to the Electric Motor)

An electrical power supply to the electric motor is controlled by the ECU to rotate the electric motor in the forward or the reversed direction. The projection 10 pushes and moves the roller 4 toward the large space portion L1 by the rotational force applied to the rotational driving unit 1. Then, the rotational driving unit 1 as well as the rotational driven unit 2 becomes free from the collar 3 (namely, the rotational driven unit 2 is released from the locked condition with the collar 3). The rotational driven unit 2 is rotated together with the rotational driving unit 1, when the rotational driving unit 1 is brought into contact with the rotational driven unit 2 and the rotational force is transmitted from the rotational driving unit 1 to the rotational driven unit 2. The rotational force of the rotational driven unit 2 is reduced in its speed by the speed reduction gear, and applied to the switching device provided in the passage, in which the fluid pressure pulsation is generated, so that the switching position of the switching device is controlled.

(An Operation when the Power Supply to the Electric Motor is Cut Off)

The electrical power supply to the electric motor is cut off by the ECU, when the opening degree of the switching member has reached at its target position. When an external rotational force is applied to the switching member and then to the rotational driven unit 2 during a condition, in which the electrical power supply to the electric motor is cut off, the roller 4 is firmly held by and between the rotational driven unit 2 and the collar 3 as a result of even a small rotation of the rotational driven unit 2. The rotational driven unit 2 is engaged with the collar 3 by means of the roller 4, so that the rotation of the rotational driven unit 2 is restricted. As a result, the rotation of the switching member is blocked.

However, the high vibration, the high load and/or the large pulsation is actually applied to the switching member and then to the rotational driven unit 2 during the operation of the engine, when the electrical power supply to the electric motor is cut off, wherein the switching member is provided in the fluid passage (e.g. in the intake passage, the exhaust passage, or the like). In such a situation, the roller 4 may be moved relative to the collar 3 due to the above high vibration, the high load and/or the large pulsation applied to the rotational driven unit 2. Then, the rotational driven unit 2 may be rotated with respect to the collar 3. Accordingly, the rotation of the switching member can not be blocked. In the case that the switching position of the switching member is operated by a feed-back control, a number of operations for correcting the switching position will be extremely increased, and durability of the speed reduction gear, the bearings, the electric motor and so on may be deteriorated, as already explained above.

According to the first embodiment, therefore, the above problem is solved as follows.

A recess 11 is formed at the inner peripheral surface 5 of the collar 3, so that the roller 4 is engaged with and pushed into the recess 11. Accordingly, the roller 4 may not be easily moved or rotated by the small swinging motion of the rotational driven unit 2. According to the first embodiment, the recess is formed as a shallow groove 11, with which the roller 4 is engaged, wherein an axis of the groove 11 is in parallel to the axis of the roller 4.

The shape of the groove 11 may be formed in a curved surface substantially coinciding with the curved surface of the roller 4, as shown in FIG. 1. The curved surface may have a larger curvature than that of the roller 4. The groove 11 may be formed in other shapes, such as a rectangular groove, a triangular groove, and so on. Multiple grooves 11 may be formed at the inner peripheral surface 5 at a predetermined distance or consecutively.

According to the above structure, the roller 4 is tightly engaged with the collar 3, even when the high vibration, the high load and/or the large pulsation is applied to the rotational driven unit 2. The roller 4 is not easily moved out of the groove 11, so that the rotation of the rotational driven unit 2 relative to the collar 3 is restricted. The restriction for the rotation of the roller 4 is realized not only by a frictional force between the roller 4 and the collar 3, but also by the engagement between the roller 4 and the groove 11. As above, the change of the opening position of the switching member can be prevented.

When the electric motor is operated, the rotational driving unit 1 is rotated in the forward or the reversed direction, so that the projection 10 pushes the roller 4 toward the large space portion L1. Accordingly, the roller 4 is brought out of the engagement from the groove 11. When the rotational driving unit 1 is further rotated, it is brought into contact with the rotational driven unit 2. Then, the rotational driven unit 2 is rotated together with the rotational driving unit 1, so that the opening position of the switching member is controlled at another target position.

As explained above, according to the first embodiment, the rotation of the rotational driven unit 2 is restricted, even when the high vibration, the high load and/or the large pulsation is applied to the rotational driven unit 2.

Accordingly, the electrical power supply to the electric motor can be cut off, when the switching member is at the constant opening position. The electrical power can be thus saved.

The opening position of the switching member is not changed, even when the high vibration, the high load and/or the large pulsation is applied to the rotational driven unit 2. Therefore, the holding accuracy of the opening position of the switching member is improved.

In the case that the switching position of the switching member was operated by the feed-back control, a number of operations for correcting the switching position would not be extremely increased, so that duration of life for the speed reduction gear, the bearings, the electric motor and so on could be elongated.

Second Embodiment

Figure 2:
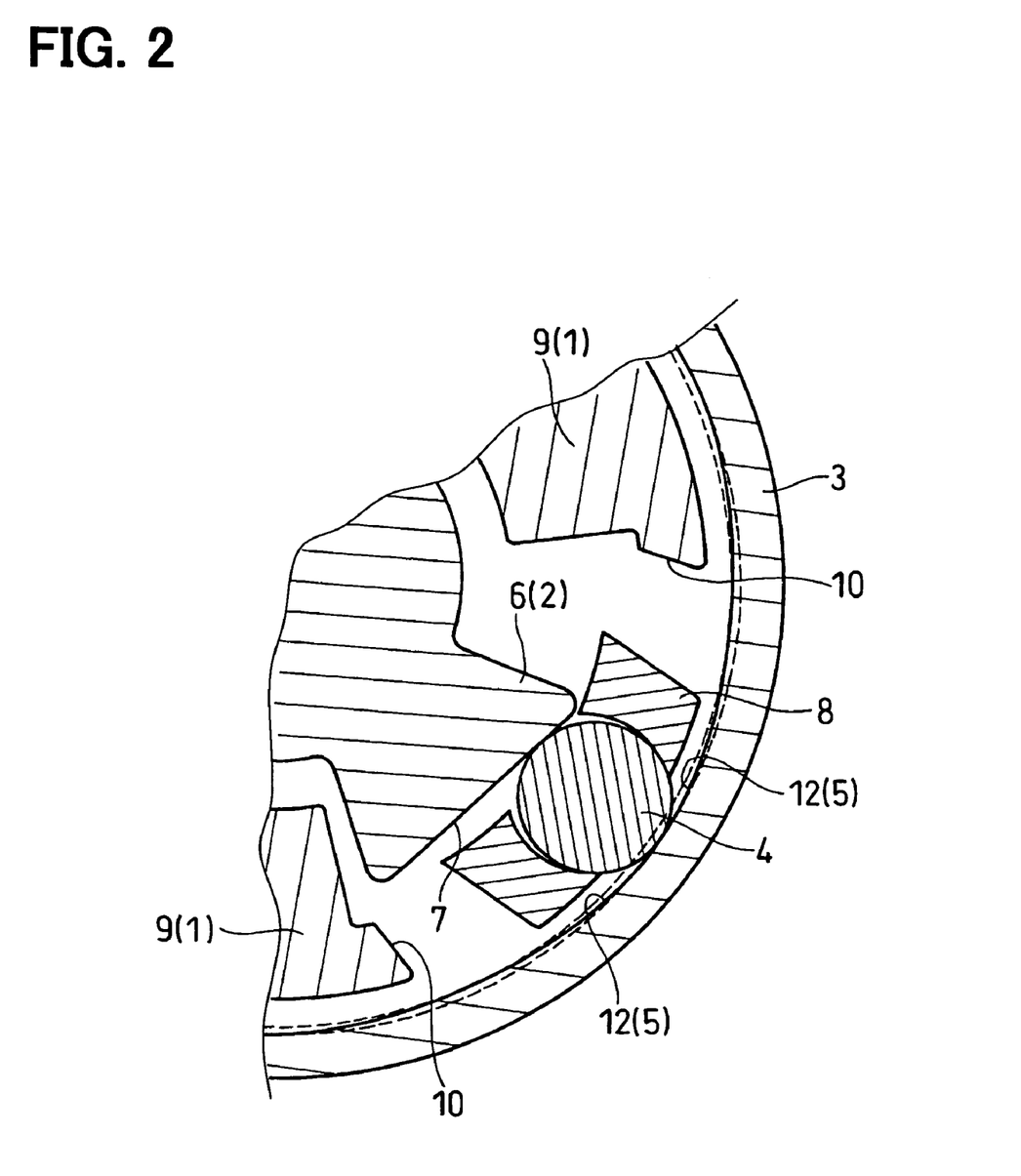
FIG. 2 is a schematic cross sectional view showing a major portion of a two-way clutch according to a second embodiment of the present invention.

A second embodiment will be explained with reference to FIGS. 2 and 3. The same reference numerals are used in the second embodiment to designate the same or substantially similar portion to the first embodiment.

According to the second embodiment, the inner peripheral surface 5 is formed in a distorted circular shape 12.

Figure 3:
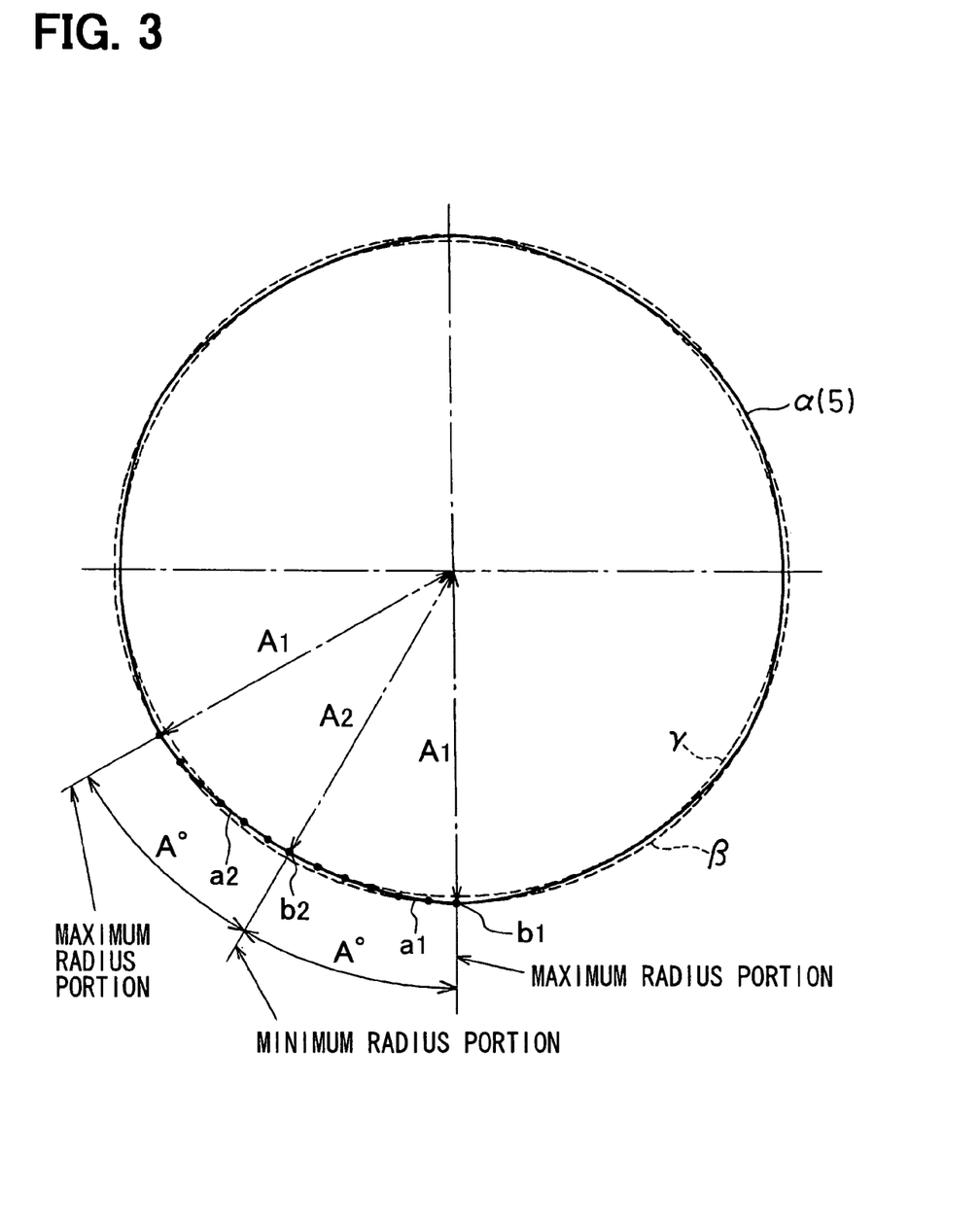
FIG. 3 is a schematic view showing a configuration of an inner peripheral surface of a collar of the second embodiment.

In FIG. 3, β designates a perfect circle having a radius A1, whereas γ designates a perfect circle having a radius A2, wherein the radius A1 is larger than the radius A2. A solid line indicated by α, which corresponds to the inner peripheral surface 5 of the collar 3, is formed in the distorted circular shape 12, wherein the solid line α windles between the circles β and γ. As shown in FIG. 3, the distorted circular shape 12 is formed by a first arc portion a1 and a second arc portion a2. In the first arc portion a1, the radius is gradually decreased from A1 to A2, whereas in the second arc portion a2, the radius is gradually increased from A2 to A1. The first and second arc portions are alternately connected to form the distorted circular shape 12. In the second embodiment, each of the first and second arc portions a1 and a2 has a predetermined angle A°. A portion b1 of the inner peripheral surface 5 is a portion, at which the radius is maximum, whereas a portion b2 of the inner peripheral surface 5 is a portion, at which the radius is minimum. The portion b1 corresponds to the recess of the invention, wherein the recess b1 is formed by the first and second arc portions a1 and a2, which are slowly inclined with respect to the perfect circle.

According to the above structure of the second embodiment, the roller 4 is firmly held by and between the rotational driven unit 2 and the inner peripheral surface 5 of the distorted circular shape 12, when the electrical power supply to the electric motor is cut off. Therefore, the rotation of the roller 4 (i.e. the relative movement of the roller 4 to the collar 3) is surely restricted, even when the high vibration, the high load and/or the large pulsation is applied to the rotational driven unit 2. Accordingly, the same effect to the first embodiment can be obtained.

Third Embodiment

Figure 4:
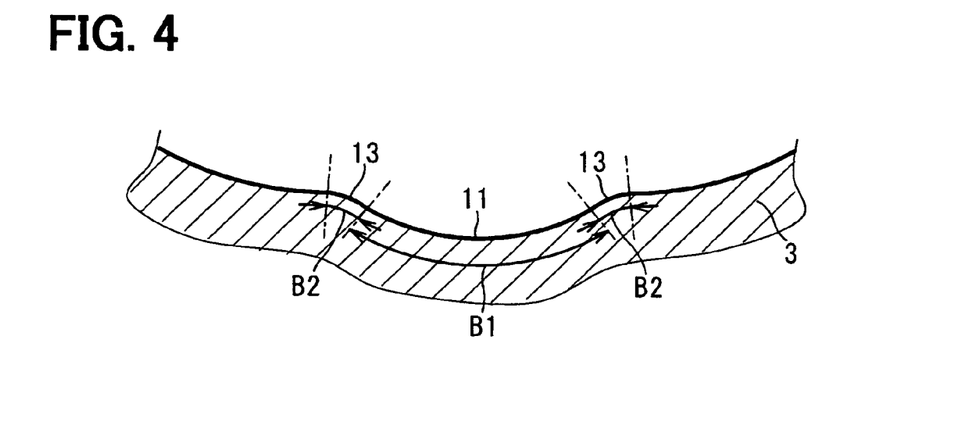
FIG. 4 is a schematic view showing a configuration of an inner peripheral surface of a collar according to a third embodiment.

A third embodiment will be explained with reference to FIG. 4.

According to the third embodiment, a width of the groove 11 of the circumferential direction is made longer than that in the first embodiment. And a pair of raised surface portions 13 is formed at both sides of the groove 11.

According to the above structure of the third embodiment, the roller 4 is firmly held by and between the rotational driven unit 2 and the groove 11 of the inner peripheral surface 5, when the electrical power supply to the electric motor is cut off. Therefore, the rotation of the roller 4 (i.e. the relative movement of the roller 4 to the collar 3) is surely restricted, even when the high vibration, the high load and/or the large pulsation is applied to the rotational driven unit 2. Accordingly, the same effect to the first embodiment can be obtained.

According to the third embodiment, the recess 11 and the raised surface portion 13 are formed at the inner peripheral surface of the collar 3.

In this embodiment, the recess 11 is a curved surface expanding in a radial direction toward an outside from a perfect circle formed by the inner peripheral surface of the collar 3, whereas the raised surface portion 13 is a curved surface expanding in the radial direction toward an inside from the perfect circle formed by the inner peripheral surface of the collar 3. In FIG. 4, B1 designates a portion for the recess (the groove) 11, and B2 designates a portion for the raised surface portion 13. The recess 11 and the raised surface portions 13 are connected by a continuous curved surface with each other.

According to the above structure (namely the outwardly expanding recess 11, the inwardly expanding raised surface portions, and the continuous curved surfaces between them), an operating sound can be reduced when the roller 4 is pushed out of the groove 11, in the case that the electrical power is supplied to the electric motor and the rotational driven unit 2 is rotated by the rotational driving unit 1.

Fourth Embodiment

A fourth embodiment will be explained with reference to FIGS. 5A and 5B.

As already explained in the first embodiment, the roller 4 is pushed by the projection 10 to move toward the large space portion L1, when the electrical power is supplied to the electric motor to rotate it in the forward or the reversed direction, so that the locked condition between the rotational driven unit 2 and the collar 3 is released. Then, the rotational force of the rotational driving unit 1 is transmitted to the rotational driven unit 2, so that the rotational driven unit 2 and the roller 4 are rotated.

When the roller 4 as well as the rotational driven unit 2 is rotated together with the rotational driving unit 1 at a high speed, the roller 4 is temporally separated from the inner peripheral surface of the collar 3 (from the raised surface portion 13) at crossing the groove 11 and the roller 4 is brought into contact again with the inner peripheral surface of the collar 3. In FIG. 5A, a reference numeral C1 designates a separating point, at which the roller 4 is temporally separated from the inner peripheral surface of the collar 3 (from the raised surface portion 13), whereas a reference numeral C2 designates a contacting point, at which the roller 4 is brought into contact again with the inner peripheral surface of the collar 3.

Figure 5A:
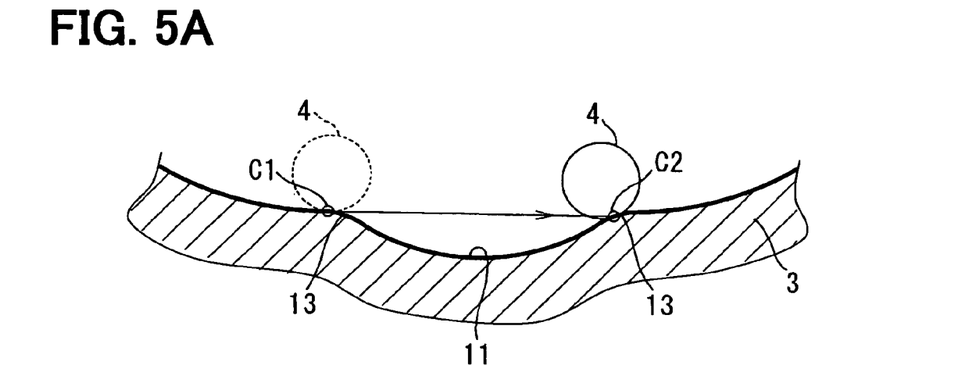
FIG. 5A is a schematic view for the inner peripheral surface similar to FIG. 4, showing a contacting point C2.
Figure 5B:
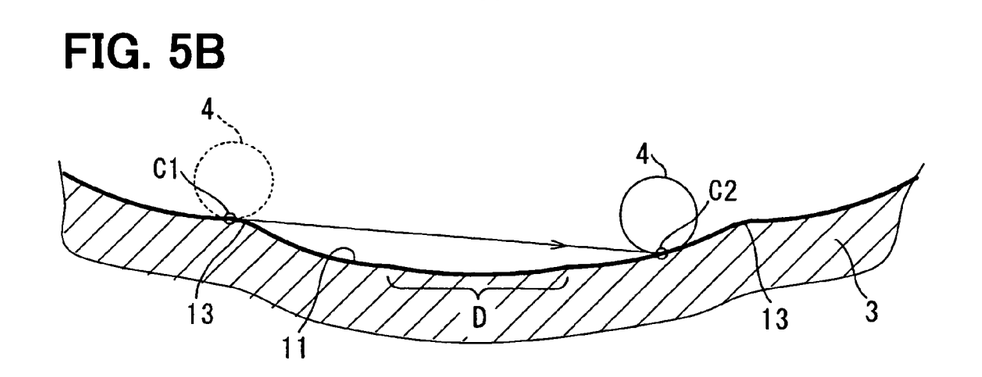
FIG. 5B is a schematic view showing a configuration of an inner peripheral surface of a collar according to a fourth embodiment.

In the case that the contacting point C2 is located at the raised surface portion 13, as shown in FIG. 5A, a touchdown angle of the roller 4 with respect to the inner peripheral surface (the raised surface portion 13) of the collar 3 becomes a steep angle. As a result, a large impulse force may be generated at the touchdown. It is, therefore, a problem that the durability of the roller 4 as well as the collar 3 may be deteriorated, and a hitting sound becomes larger.

According to the fourth embodiment, a circumferential length (i.e. width) of the groove 11 is so designed that the contacting point C2 may be located at such a point of the curved surface of the groove 11. Namely, as shown in FIG. 5B, the length of the groove 11 is made longer, by a distance D, than the length of the groove 11 shown in FIG. 5A.

According to the above structure, the roller 4 is suppressed from hitting the raised surface portion 13 in an operating speed range of the rotational driving unit 1.

The surface pressure force generated at the inner peripheral surface of the collar 3 (the curved surface of the groove 11) can be thus reduced, even when the roller 4 repeats its operation of separation and contact during a high speed rotation of the rotational driving unit 1. The generation of the abnormal noise (i.e. the hitting sound) as well as the deterioration of the durability for the roller 4 and the collar 3 is suppressed.

Furthermore, as the outwardly expanding recess 11 (the groove 11), the inwardly expanding raised surface portions 13, and the continuous curved surfaces between them are formed as in the same manner to the third embodiment (FIG. 4), the operating sound can be reduced when the roller 4 is pushed out of the groove 11, in the case that the electrical power is supplied to the electric motor and the rotational driven unit 2 is rotated by the rotational driving unit 1.

(Modifications)

In the above embodiments, the roller 4 is supported by the holder member 8. However, the holder member 8 is not always necessary.

In the above embodiments, the roller 4 may be replaced by a ball, or any other rolling member. The outer configuration of the roller may not be always formed in the perfect circle, but in an oval shape. The roller 4 may be further replaced by a sliding member, which can slide between the rotational driven unit 2 and the collar 3.

In the above embodiments, the collar 3 is arranged at the outer peripheral side of the rotational driving and driven units 1 and 2. However, the collar 3 may be arranged at an inner peripheral side of the rotational driving and driven units 1 and 2. In such a case, an outer peripheral surface of the collar 3 acts as a surface, with which the roller is operatively brought into contact. Therefore, the recess is formed at the outer peripheral surface of the collar 3.

The two-way clutch according to the above embodiments are preferably applied to such a case, in which the high vibration, the high load and/or the large pulsation is applied to the rotational driven unit 2. The present invention can be also applied to the two-way clutch, in which the high vibration, the high load and/or the large pulsation is not always applied to the rotational driven unit 2. The present invention can be also applied to the two-way clutch, in which only the low load is applied to the rotational driven unit 2.

In the above embodiments, the two-way clutch is applied to the driving device for the switching member, which is arranged in the passage in which the fluid pressure pulsation is generated. The two-way clutch may be applied to any other driving device, in which an output shaft of the driving device is rotated in both rotational directions (forward and reversed directions). For example, the present invention may be applied to a hinge portion of a robot arm, an opening-closing device for a door, a curtain, a screen and so on.

In the above embodiments, the electric motor is used as the driving device. The driving device may be, however, replaced by a fluid motor, which is operated by force of wind or hydraulic power, or any other driving means.

What is claimed is:

1. A two-way clutch comprising:
   a rotational driving unit to be rotated by an external driving device;
   a rotational driven unit to be brought into contact with the rotational driving unit in a circumferential direction, and to be rotated by the rotational driving unit;
   a non-rotatable annular collar arranged at an outer periphery of the rotational driven unit; and
   an interposed member interposed between the rotational driven unit and the collar,
   wherein a large space portion is formed in a radial direction of the rotational driven unit between an outer peripheral surface of the rotational driven unit and an inner peripheral surface of the collar,
   small space portions are formed in the radial direction of the rotational driven unit, at both circumferential sides of the large space portion, and between the outer peripheral surface of the rotational driven unit and the inner peripheral surface of the collar,
   a distance of the small space portions in the radial direction of the rotational driven unit is smaller than that of the large space portion,
   a length of the interposed member in the radial direction of the rotational driven unit is smaller than the distance of the large space portion but larger than the distance of the small space portion,
   a projection is formed on the rotational driving unit for pushing the interposed member toward the large space portion, when the rotational driving unit is brought into contact with the rotational driven unit in the circumferential direction, and
   a recess is formed in the inner peripheral surface, so that the interposed member is engaged with the recess when the rotational driven unit is locked to the collar via the interposed member.

2. The two-way clutch according to claim 1, wherein the recess is formed by a groove.

3. The two-way clutch according to claim 1, wherein the recess is formed by a slowly inclined curved surface.

4. The two-way clutch according to claim 1, wherein a raised surface portion is formed at a circumferentially neighboring point to the recess in the inner peripheral surface of the collar, and the recess has a circumferential length such that a contacting point of the interposed member is located in the recess, wherein the interposed member is temporally separated from the inner peripheral surface of the collar and brought into contact again with the inner peripheral surface of the collar at the contacting point when the rotational driven unit is rotated at a high speed.

5. The two-way clutch according to claim 1, wherein
the interposed member is formed as a roller, which is rotatably supported by a holder member in the circumferential direction, wherein the holder member is rotatably supported with respect to the rotational center of the rotational driving unit and the rotational driven unit, and
the projection pushes the holder member in the circumferential direction to move the interposed member toward the large space portion.

6. The two-way clutch according to claim 1, wherein
the rotational driven unit is operatively connected to a switching member through a speed reduction gear, wherein the switching member is provided in a fluid passage, in which a fluid pressure pulsation is generated.

7. The two-way clutch according to claim 1,
wherein the inner peripheral surface of the collar is composed of a first arc portion and a second arc portion, and
wherein a radius of the first arc portion is gradually decreased from a first radius to a second radius, and a radius of the second arc portion is gradually increased from the second radius to the first radius.

* * * * *